United States Patent [19]

Welch

[11] 4,311,164

[45] Jan. 19, 1982

[54] VALVE HANDLE RETENTION SYSTEM

[75] Inventor: Elmer S. Welch, Silver Lake, Wis.

[73] Assignee: Superior Stainless, Inc., Delavan, Wis.

[21] Appl. No.: 134,168

[22] Filed: Mar. 26, 1980

[51] Int. Cl.³ ............................................. F16K 43/00
[52] U.S. Cl. ..................................... 137/315; 24/242; 292/353; 251/318; 403/16; 403/316
[58] Field of Search ......................... 24/3.5, 81 J, 90.5, 24/242; 74/1 R; 137/15, 315, 383; 222/153; 220/85 P; 292/353; 251/291, 318; 403/11, 16, 33, 316

[56] References Cited

U.S. PATENT DOCUMENTS

| | | | |
|---|---|---|---|
| 1,951,188 | 3/1934 | Flaherty | 292/353 |
| 2,252,855 | 8/1941 | Lasch | 292/353 |
| 3,198,206 | 8/1965 | O'Brien | 137/315 |
| 3,649,057 | 3/1972 | Urciola | 403/16 |

FOREIGN PATENT DOCUMENTS 564339  9/1944  United Kingdom ................ 292/353

Primary Examiner—Martin P. Schwadron
Assistant Examiner—G. L. Walton

Attorney, Agent, or Firm—Mason, Kolehmainen, Rathburn & Wyss

[57] ABSTRACT

A simple but effective valve assembly is disclosed wherein a valve stem retaining spring clip is mounted within a valve stem removal aperture in the valve handle to prevent inadvertent disassembly of the valve handle from the valve stem. The valve assembly of the present invention includes a valve body having a fluid entrance and a fluid exit; a valve plug longitudinally movable within the valve body and disposed, in a valve closed position, against a valve seat to prevent fluid from entering said valve body; a valve stem disposed longitudinally through the valve body connecting the valve plug to a valve handle assembly; a valve body neck portion for securing the valve handle assembly to the valve body and a valve handle assembly including a valve stem retaining notch and an adjoining valve stem receiving aperture larger than the diameter of a handle connecting portion of the valve stem. The valve handle assembly includes a retention spring disposed within the valve stem receiving aperture so that the handle connecting valve stem portion cannot fit through the aperture freely until sufficient force is applied to the retention spring to force the retention spring radially outwardly from the valve stem receiving aperture.

11 Claims, 7 Drawing Figures

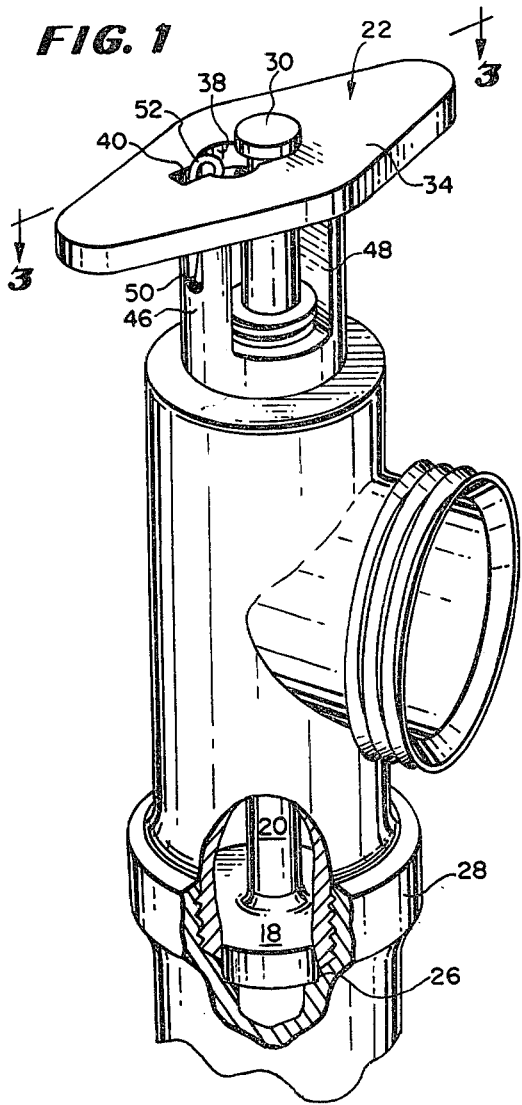
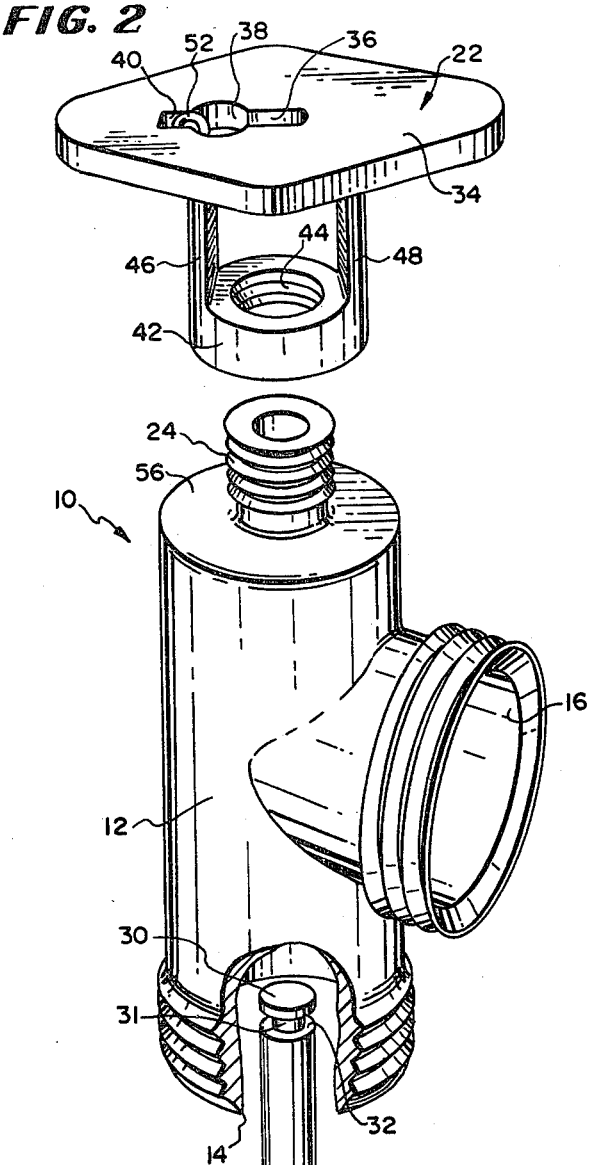
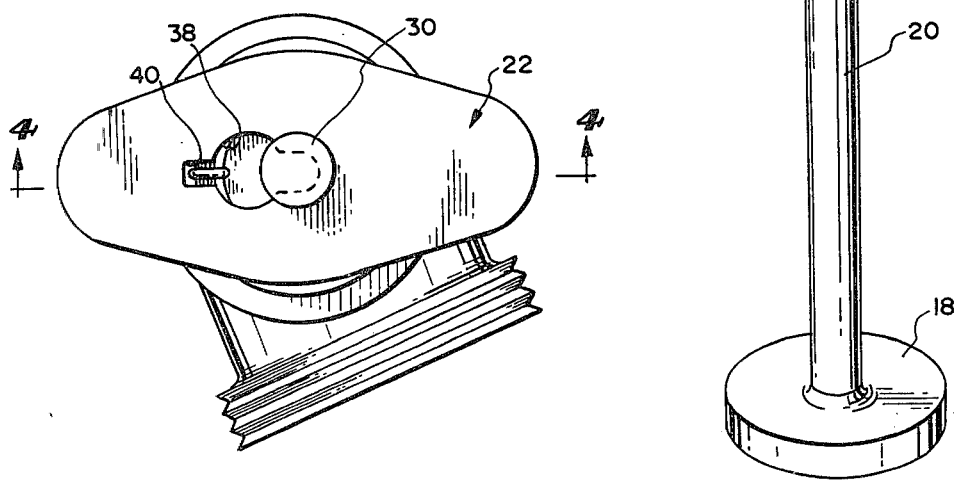

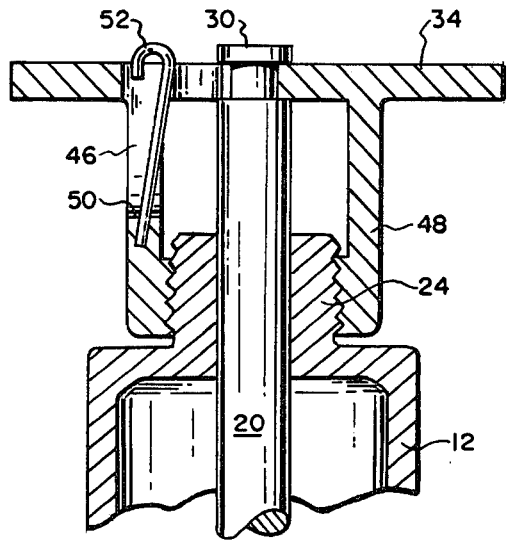
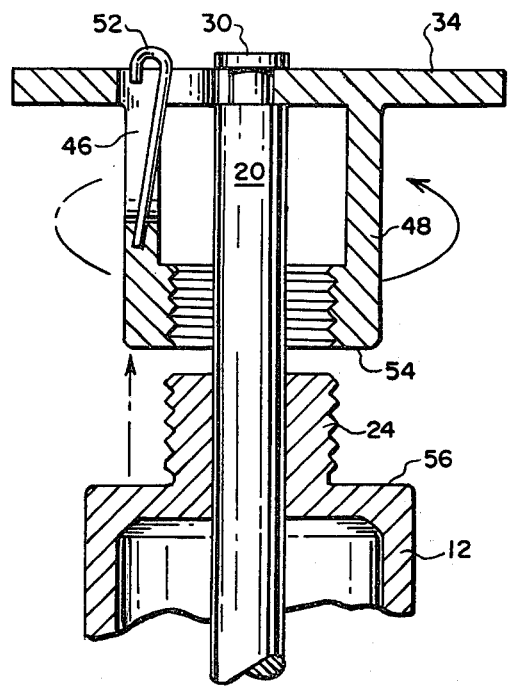
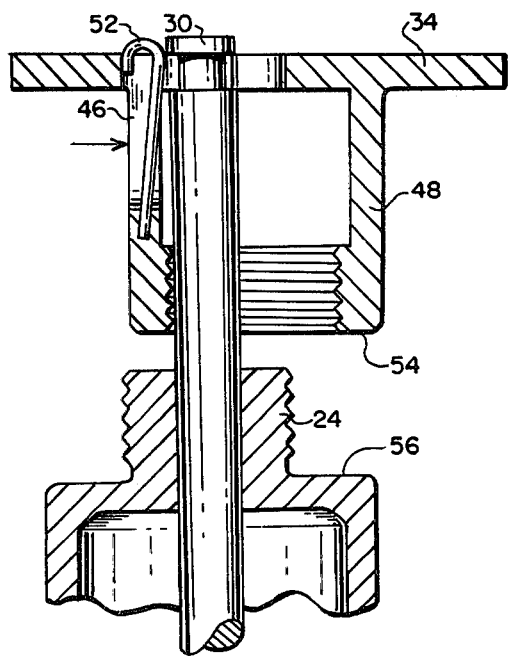
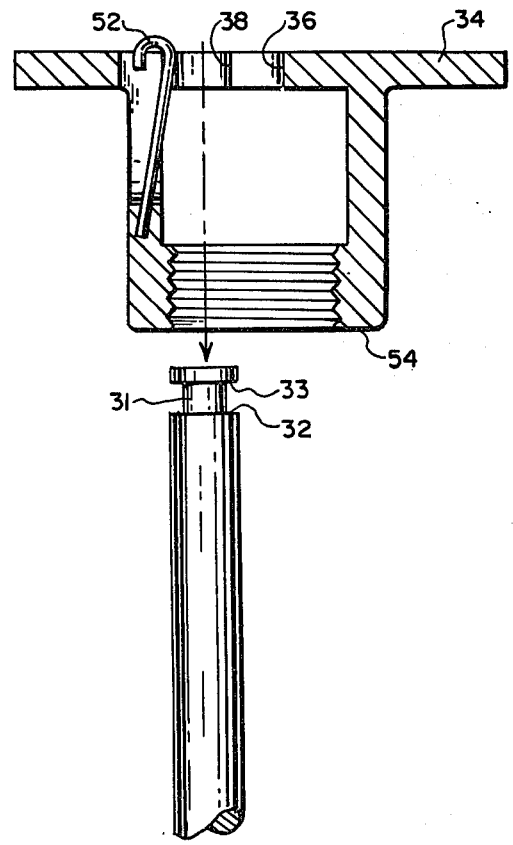

VALVE HANDLE RETENTION SYSTEM

FIELD OF THE INVENTION

The present invention relates to a valve assembly including a valve handle retention assembly and, more particularly, to a valve handle retention assembly for use on a valve for the sanitary food industry wherein a valve stem, connected to the valve handle, is releasably held to the valve handle with a spring biased valve stem retaining clip.

BACKGROUND OF THE INVENTION

In the sanitary food industry, it is common to have a valve assembly made of a suitable non-corrosive material, such as stainless steel, wherein the valve is readily disassembled for cleaning. Some of the valves made for the sanitary food industry include a valve stem operably and releasably attached to a valve handle so that the valve is manually operable by moving the valve handle longitudinally with respect to the valve body. In the above described type of sanitary valve, in order to releasably secure the valve stem to the valve handle, it is necessary to operably connect the valve stem to the valve handle so that longitudinal movement of the valve handle actuates the valve assembly. It is further desireable to be able to release the handle from the valve stem, when the valve is in an open position, so that the valve handle and valve stem can be removed from the valve body for cleaning of the valve parts.

It is known to provide the valve handle of the above described sanitary valves with a notch and adjoining larger aperture such that the valve stem is held to the valve handle when the stem is inserted within the notch, and the valve handle can be released from the valve stem, when the valve is in an open position, by sliding the valve stem transversely into the adjoining aperture. It has been found that often, when the above described valve is in an open position, the valve handle is inadvertently or mistakenly detached from the valve stem and can be lost and/or unavailable for valve operation.

SUMMARY OF THE INVENTION

In accordance with the present invention, a simple but effective valve stem retaining spring clip is mounted within a valve stem removal aperture in the valve handle to prevent inadvertent disassembly of the valve handle from the valve stem.

In brief, the valve assembly of the present invention includes a valve body having a fluid entrance and a fluid exit; a valve plug longitudinally movable within the valve body and disposed, in a valve closed position, within a valve seat to prevent fluid from entering said valve body; a valve stem disposed longitudinally through the valve body connecting the valve plug to a valve handle assembly; a valve body neck portion for securing the valve handle assembly to the valve body and a valve handle assembly including a valve stem retaining notch and an adjoining valve stem receiving aperture larger than the diameter of a handle connecting portion of the valve stem. The valve handle assembly includes a retention spring mounted within the valve stem receiving aperture so that the handle connecting valve stem portion cannot fit through the aperture freely until sufficient force is applied to the retention spring to force the retention spring radially outwardly from the valve stem receiving aperture.

Accordingly, an object of the present invention is to provide a new and improved valve assembly for the sanitary food industry.

Another object of the present invention is to provide a new and improved valve capable of disassembly for cleaning and wherein inadvertent disassembly and loss of parts is avoided in a simple and reliable manner.

Accordingly, an object of the present invention is to provide a valve assembly including a valve handle releasably connected to a valve stem and including a spring biased valve stem retaining clip capable of being moved from a valve stem retaining position for release of the handle from the valve stem when the handle is in the valve open position.

Another object of the present invention is to provide a valve assembly having a valve handle which releasably retains a valve stem wherein the handle includes a valve stem retaining notch adjoining a valve stem receiving aperture and including a biased valve stem retaining clip disposed within a separate retaining clip receiving notch adjoining the aperture and biased within the aperture to prevent the valve stem from completely entering the aperture when the handle is removed from the valve body. The valve stem can be released from the valve handle by forcing the retaining clip radially outwardly, as by pressing the handle connecting valve stem portion against the retention clip, to a position almost entirely within the clip receiving notch to permit removal of the valve stem through the aperture.

BRIEF DESCRIPTION OF THE DRAWINGS

These and other objects and advantages of the present invention will be better understood by reference to the following detailed description taken in conjunction with the drawings, in which:

FIG. 1 is a perspective view, partly broken away, of the valve assembly constructed in accordance with the principles of the present invention and shown attached to a conduit having a valve seat;

FIG. 2 is an exploded perspective view of the valve assembly of the present invention showing the valve assembly disassembled;

FIG. 3 is a top view of the valve assembly of the present invention taken along the line 3—3 of FIG. 1;

FIG. 4 is a fragmentary, cross-sectional view of the valve assembly of the present invention taken along the line 4—4 of FIG. 3 showing the valve assembly in a valve-closed position;

FIG. 5 is a fragmentary, cross-sectional view similar to FIG. 4 showing the valve in a valve-open position;

FIG. 6 is a fragmentary, cross-sectional view similar to FIG. 4 showing the valve in a valve-open position while the valve stem is forced against the retaining clip for removal of the valve stem from the valve handle; and FIG. 7 is a fragmentary, cross-sectional view similar to FIG. 4 showing the valve handle removed from the valve stem.

DETAILED DESCRIPTION OF A PREFERRED EMBODIMENT

Referring now to the drawings, and initially to FIGS. 1 and 2, there is illustrated a new and improved valve assembly constructed in accordance with the principles of the present invention generally designated by reference numeral 10. The valve assembly 10 generally includes a valve body 12 having a fluid entrance 14 and a fluid exit 16; a valve plug 18 including a valve plug stem 20; and a manually operable valve handle assembly generally designated by reference numeral 22 removably secured to the valve body 12 through a threaded valve body extension or neck member 24.

The valve plug 18 rests against a valve seat 26 when disposed within a threaded valve assembly connecting conduit 28, as shown in FIG. 1, when the valve is in a closed position. The valve stem 20 includes a valve handle retaining or connecting member 30 spaced from a valve handle contacting end 32 of valve stem 20 for releasably retaining the valve stem 20 to the valve handle 22. A pin 31 integrally connects the handle contacting end 32 of valve stem 20 to an undersurface 33 of valve handle connecting member 30. In accordance with an important feature of the present invention the pin 31 is adapted to fit within the valve plug stem retaining slot 36 with the undersurface 33 of the valve handle retaining member 30 lying above the slot 36 and valve handle contacting end 32 of valve stem 20 lying under the slot 36. Neither the valve handle retaining member 30 nor the valve handle contacting end 32 of valve stem 20 can fit within the slot 36 so that the valve stem can be retained within the valve handle assembly 22 only by longitudinally inserting the valve handle retaining member 30 of valve stem 20 through aperture 38 and then transversely sliding pin 31 into the slot 36.

In this manner, the valve stem 20 is operably attached to the handle 34 so that the valve stem 20 can be lifted to open the valve assembly 10 by longitudinal upward movement of the valve handle assembly 22 via lifting contact of an upper surface of valve handle 34 against the undersurface 33 of the valve handle retaining member 30. Likewise, the valve stem 20 can be forced downwardly to close the valve assembly 10, by longitudinal downward movement of the valve handle assembly 22 via contact of an undersurface of valve handle 34 against the valve handle contacting end 32 of valve handle 20 as the valve handle assembly 22 is manually threaded downwardly to the position shown in FIG. 4.

The valve handle assembly 22 includes a handle member 34 having a valve plug stem retaining slot 36; a valve plug stem receiving aperture 38 and a retention spring receiving slot 40 extending through the valve handle 34; a valve handle assembly connecting member 42 including a threaded aperture 44 for connecting the valve handle assembly 22 to the valve body extension or neck member 24; and a pair of valve handle leg members 46 and 48 connecting the valve handle assembly connecting member 42 to the valve handle 34 in spaced relation thereto. One leg member 46 of the valve handle assembly 22 includes a longitudinal slot 50 for receiving the retention spring 52 mounted within the aperture 50 at its base and extending upwardly and inwardly toward the valve stem 20 so that an upper portion of the retention spring 52 extends within the valve stem receiving aperture 38 of valve handle 34 to prevent the valve handle retaining member 30 of valve stem 20 from passing through the aperture 38 unless sufficient force is applied to the retaining spring 52 to remove it from the aperture 38, as shown in FIG. 6.

The valve assembly 10 is closed by manually turning the valve handle assembly 22 onto the valve body neck member 24 until the valve plug 18 seats against the valve seat 26, as shown in FIG. 1. The valve plug 18 extends a predetermined distance outwardly from the valve body 12 to seal effectively against the valve seat 26. When the valve is closed, an undersurface 54 of the valve handle assembly connecting member 42 does not contact an upper surface 56 of the valve body 12, as shown in FIG. 4, so that the handle assembly 22 always can be sufficiently tightened to provide a fluid tight seal of valve plug 18 against the valve seat 26.

In accordance with an important feature of the preferred embodiment of the present invention, the retention spring receiving slot 40 is disposed directly across aperture 38 from valve plug stem receiving slot 36 so that the longitudinal axes of slots 36 and 40 lie along the same line which intersects the center of valve stem receiving aperture 38. Such construction of the aperture 38 and adjoining slots 36 and 40 enables the user to remove the valve stem 20 easily by threadedly removing the valve handle assembly 22 from the valve body neck menber 24, as shown in FIG. 5, and forcing the valve handle retaining member 30 against the retention spring 52, as shown in FIG. 6, over a straight, transverse travel path from slot 36 toward slot 40.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A valve assembly including a valve body having a fluid entrance and a fluid exit, a valve plug longitudinally movable within said valve body, a valve stem disposed longitudinally through said valve body connecting said valve plug to a valve handle, means for securing said valve handle to said valve body, means for removing said valve handle from said valve body, said valve handle including a valve stem retaining notch and an adjoining valve stem receiving aperture larger than a diameter of a handle connecting portion of said valve stem and means extending within said aperture for engaging said valve stem when said valve handle is removed from said valve body when sufficient force is applied to said means for engaging said valve stem to force said valve stem engaging means radially outwardly from said aperture so that said valve stem can be released from said valve handle through said aperture and said handle connecting portion cannot fit through said aperture freely thereby maintaining said handle connecting portion of said valve stem within said aperture until said valve stem engaging means is forced radially outwardly from said aperture.

2. A valve assembly as defined in claim 1 wherein said handle connecting portion of said valve stem is adapted to be received by said aperture for connection to and release from said handle and adapted to overlie said valve stem retaining notch to retain the valve stem to the valve handle so long as a portion of said handle connecting portion overlies said notch.

3. A valve assembly as defined in claim 2 wherein the valve stem includes a groove disposed under said valve handle retaining member adapted to be received by said valve stem retaining notch.

4. A valve assembly as defined in claim 1 wherein said valve handle includes a retention spring receiving notch adjoining said aperture, said retention spring being disposed within said notch at an angle upwardly and inwardly toward said valve stem.

5. A valve assembly as defined in claim 1 wherein said handle includes a threaded member defining a valve body attachment aperture spaced from said stem receiving aperture and disposed between said stem receiving aperture and said valve body when said valve is in a closed position for securing said valve handle to said valve body.

6. A valve assembly as defined in claim 5 wherein said valve stem is centrally disposed within said valve body and, with said valve in a closed position, said valve handle retaining member overlies said valve stem retaining notch.

7. A valve assembly comprising:
a valve body;
a valve member movable longitudinally within said valve body between open and closed positions;
a valve seat removably connected to one end of the valve body;
a wall closing the other end of said valve body;
a stem extending from said valve member and through said wall to the exterior of said valve body;
a valve handle releasably attached to the stem;
said stem having a segment of reduced diameter;
said handle having an aperture with a first portion larger than the stem diameter and a second portion smaller than the stem diameter and larger than said reduced diameter;
and the improvement comprising:
handle retention means movable with respect to said handle toward and away from a position wherein said retention means blocks the first portion of said aperture; and
said retention means resiliently biased to said blocking position so that when said handle is removed from said valve body the handle retention means can be engaged by said valve stem to move said retention means so that the retention means does not block passage of the valve stem through the first portion of said aperture so that said valve stem can be released from said valve handle through said aperture.

8. A valve assembly as claimed in claim 7 wherein said retention means comprises a spring member having a first portion anchored to said handle and a second portion normally disposed in said first aperture portion.

9. A valve assembly including a valve body having a fluid entrance and a fluid exit, a valve plug longitudinally movable within said valve body, a valve stem disposed longitudinally through said valve body connecting said valve plug to a valve handle, means for securing said valve handle to said valve body, means for removing said valve handle from said valve body, said valve handle including a valve stem retaining notch and an adjoining valve stem receiving aperture larger than a diameter of a handle connecting portion of said valve stem and having a retention spring extending within said aperture so that said handle connecting portion cannot fit through said aperture freely thereby maintaining said handle connecting portion of said valve stem within said aperture to maintain said valve stem connected to said valve handle when said valve handle is removed from said valve body until sufficient force is applied to said retention spring to force said retention spring radially outwardly from said aperture so that said valve stem can be released from said valve handle through said aperture.

10. A valve assembly including a valve body having a fluid entrance and a fluid exit, a valve plug longitudinally movable within said valve body, a valve stem disposed longitudinally through said valve body connecting said valve plug to a valve handle, means for securing said valve handle to said valve body, means for removing said valve handle from said valve body, said valve handle including a valve stem retaining notch and an adjoining valve stem receiving aperture larger than a diameter of a handle connecting portion of said valve stem and having means extending within said aperture for engaging said handle connecting portion of said valve stem when said valve handle is removed from said valve body, the valve stem can be moved laterally to engage said valve stem engaging means to laterally move said valve stem engaging means sufficiently to permit the handle connecting portion of said valve stem to pass through said aperture so that said valve stem can be released from said valve handle through said aperture.

11. A valve assembly including a valve body having a fluid entrance and a fluid exit, a valve plug longitudinally movable within said valve body, a valve stem disposed longitudinally through said valve body connecting said valve plug to a valve handle, means for securing said valve handle to said valve body, means for removing said valve handle from said valve body, said valve handle including a valve stem retaining notch and an adjoining valve stem receiving aperture larger than a diameter of a handle connecting portion of said valve stem and having a retention spring extending within said aperture to maintain said valve stem connected to said valve handle when said valve handle is removed from said valve body until sufficient force is applied to said retention spring to force said retention spring sufficiently radially outwardly from said aperture so that said valve stem can pass through said aperture to release said valve stem from said valve handle.

* * * * *